US007773083B2

(12) United States Patent
Minami

(10) Patent No.: US 7,773,083 B2
(45) Date of Patent: Aug. 10, 2010

(54) ACTIVE MATRIX DISPLAY DEVICE AND SEMICONDUCTOR DEVICE FOR TIMING CONTROL THEREOF

(75) Inventor: Akihiro Minami, Kumamoto (JP)

(73) Assignee: Mitsubishi Electric Corporation, Tokyo (JP)

( * ) Notice: Subject to any disclaimer, the term of this patent is extended or adjusted under 35 U.S.C. 154(b) by 822 days.

(21) Appl. No.: 11/623,990

(22) Filed: Jan. 17, 2007

(65) Prior Publication Data

US 2007/0165127 A1 Jul. 19, 2007

(30) Foreign Application Priority Data

Jan. 18, 2006 (JP) .......................... P2006-009709

(51) Int. Cl.
*G06F 3/038* (2006.01)
*G09G 5/00* (2006.01)

(52) U.S. Cl. ...................................... 345/213; 345/204

(58) Field of Classification Search ...................... None
See application file for complete search history.

(56) References Cited

U.S. PATENT DOCUMENTS 5,699,076 A * 12/1997 Tomiyasu .................. 345/103
6,538,648 B1 * 3/2003 Koike et al. ................ 345/213
2002/0140661 A1 * 10/2002 Miyajima et al. ............ 345/96
2007/0030232 A1 2/2007 Minami

FOREIGN PATENT DOCUMENTS

| | | |
|---|---|---|
| JP | 11-231843 | 8/1999 |
| JP | 2000-338936 | 12/2000 |
| JP | 2001-202066 | 7/2001 |
| JP | 2003-91266 | 3/2003 |
| JP | 2003-162257 | 6/2003 |
| KR | 10-0503941 | 7/2005 |

* cited by examiner

*Primary Examiner*—Alexander Eisen
*Assistant Examiner*—Matthew Yeung
(74) *Attorney, Agent, or Firm*—Oblon, Spivak, McClelland, Maier & Neustadt, L.L.P.

(57) ABSTRACT

An active matrix display device includes: a plurality of pixels that are disposed in a matrix; a plurality of image signal lines that are disposed to correspond to respective columns of the pixels; a plurality of scanning signal lines that are disposed to correspond to respective rows of the pixels; an image signal line driving unit that supplies image signals for driving the pixels to the image signal lines; and a timing control circuit that transmits an image display control signal to the image signal line driving unit with a predetermined cycle even during a vertical blanking period. The timing control circuit performs a control operation allows the image signal line driving unit to intermit a read operation of image display data during the first period that is defined within the vertical blanking period and that includes at least a second half of the vertical blanking period.

8 Claims, 6 Drawing Sheets

ACTIVE MATRIX DISPLAY DEVICE AND SEMICONDUCTOR DEVICE FOR TIMING CONTROL THEREOF

CROSS-REFERENCE TO RELATED APPLICATIONS

This application is based upon and claims the benefit of priority from Japanese Patent Application No. 2006-009709, filed on Jan. 18, 2006, the entire contents of which are incorporated herein by reference.

BACKGROUND OF THE INVENTION

1. Field

The present invention relates to an active matrix display device in which a control signal driving the active matrix display device can be continuously supplied to an image signal line driving unit of the active matrix display device even during a vertical blanking period.

2. Description of the Related Art

In a driving circuit for an image display device, such as a liquid crystal display device like an active matrix display device, similar to a vertical scanning effective display period, a control signal is continuously supplied to an image signal line driving unit even in a vertical blanking period. This enables image signal lines (source lines) of the display device is maintained in a state similar to a driving state. This is effective in that irregularities can be prevented from occurring in display on a display screen for each horizontal line.

As such, in order to continuously supply the control signals to the image signal line driving unit during the vertical blanking period, the respective control signals need to be transmitted at the same timing (period) as the timing during a vertical scanning period or the similar timing to the timing during the vertical scanning period. Further, a timing of a horizontal synchronizing signal that is generated during the vertical blanking period needs to be the same as or similar to the timing of a signal generated during a vertical scanning effective display period. JP-A-2003-91266 discloses an image display device including a horizontal reference signal generating circuit that generates a pseudo horizontal reference signal during the vertical blanking period (for example, FIG. 6 of JP-A-2003-91266).

However, when a synchronizing signal input by an external signal source (for example, computer main unit side or the like) varies and the length of the vertical blanking period varies, a control signal that is transmitted from a display control unit to an image signal line driving unit during the vertical blanking period interferes with a control signal that is transmitted from a timing control unit to the image signal line driving unit during a display period of a next frame after the vertical banking period is completed. As a result, the image signal line driving unit may cause an erroneous operation.

Accordingly, a driving control signal is not transmitted by a final portion of a vertical blanking period (corresponding to about one to two horizontal periods) (for example, FIG. 9 of JP-A-2003-91266).

However, cutting a signal generated for the purpose of making the image signal line of the display device entering a driving state becomes a hindrance factor with respect to achieving the object. The signal needs to be appropriately cut during a period as short as possible. In particular, during a period until the vertical blanking period is completed, if a driving operation of the image signal line pauses for a long time, it has a large influence on a vertical scanning period of a next frame.

Further, according to the above-described method, a counter needs to be provided to count a horizontal period of the vertical blanking period. The length of the vertical blanking period varies according to systems that input signals to the liquid crystal display device. For this reason, the counter needs to estimate various signals input to the liquid crystal display device, such that the counter copes with the considered maximal counter number. Therefore, a relatively large-scaled circuit needs to be provided (for example, FIG. 17 of JP-A-2003-91266).

Further, since a value counted by the counter is used in a next frame, it is not possible to cope with external input signals in which the length of a vertical blanking period varies for each frame.

SUMMARY OF THE INVENTION

According to an aspect of the invention, there is provided an active matrix display device including: a plurality of pixels that are disposed in a matrix including a plurality of columns and rows; a plurality of image signal lines that are disposed to correspond to respective columns of the pixels; a plurality of scanning signal lines that are disposed to correspond to respective rows of the pixels; an image signal line driving unit that supplies image signals for driving the pixels to the image signal lines; and a timing control circuit that transmits an image display control signal to the image signal line driving unit with a predetermined cycle even during a vertical blanking period, wherein the timing control circuit performs a control operation that allows the image signal line driving unit to intermit a read operation of image display data during a first period, the first period that is defined within the vertical blanking period and that includes at least a second half of the vertical blanking period.

According to another aspect of the invention, there is provided a semiconductor device for timing control of an active matrix display device that includes the timing control circuit according to the above aspect of the invention.

DETAILED DESCRIPTION OF THE PREFERRED EMBODIMENTS

Figure 1:
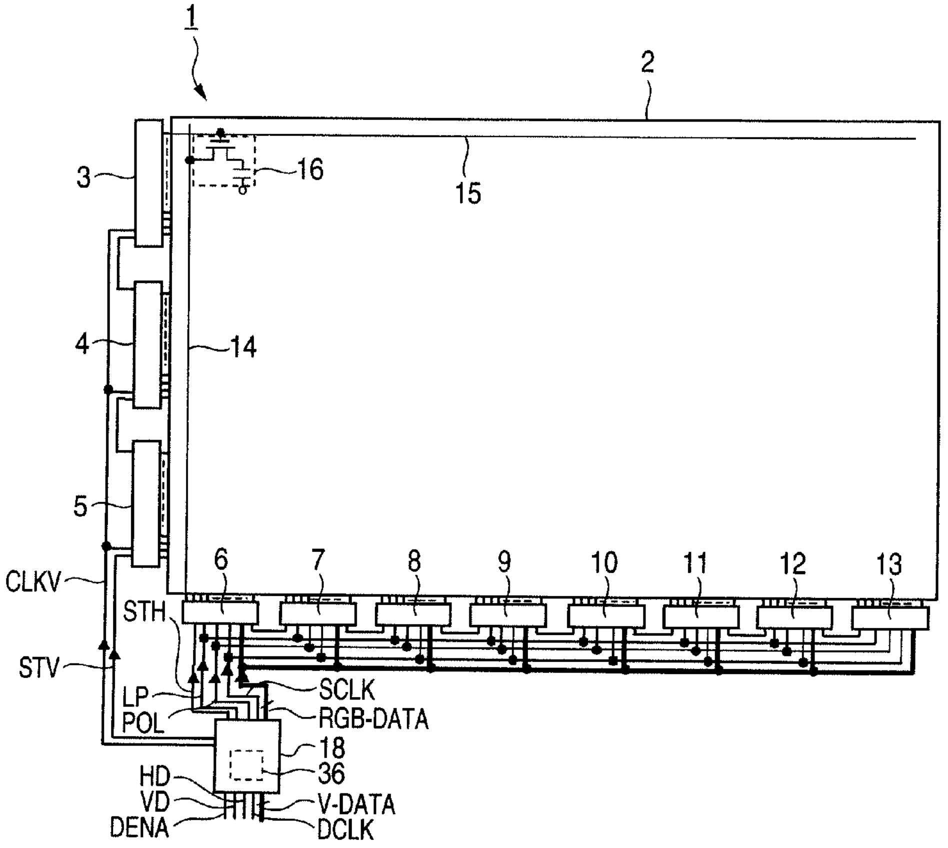
FIG. 1 is a diagram illustrating a circuit structure of a liquid crystal display device according to a first embodiment of the invention.

Hereinafter, the preferred embodiments of the invention will be described in detail with reference to the accompanying drawings. Further, in order to avoid the repetitive description, components having the same or similar functions in the respective drawings are denoted by the same reference numerals.

First Embodiment

FIG. 1 is a diagram illustrating a circuit structure of a liquid crystal display device 1 according to a first embodiment of the invention, and is a block diagram illustrating a structure of a peripheral circuit that drives a liquid crystal panel 2 as an example of an active matrix display device. In FIG. 1, the liquid crystal display device 1 includes a liquid crystal panel 2, source driver ICs 6 to 13 each of which serves as an image signal line driving unit, gate driver ICs 3 to 5 each of which serves as a scanning signal line driving unit, and a timing control circuit 18 (hereinafter, the timing control circuit is simply referred to as TCON).

In this case, the image signal line driving unit includes the eight source driver ICs 6 to 13 (each of which uses silicon semiconductor integrated circuits) that are denoted by reference numerals 6, 7, 8, 9, 10, 11, 12, and 13 in this embodiment. Similar to the image signal line driving unit, the scanning signal line driving unit includes the three gate driver ICs 3 to 5 (each of which uses a silicon semiconductor integrated circuit) that are denoted by reference numerals 3, 4, and 5 in this embodiment. Further, the timing control circuit TCON 18 is also implemented by a silicon semiconductor integrated circuit.

In order to display images in the liquid crystal display device 1, display control signals, which are input from the external signal source to the timing control circuit TCON 18, are used as a reference signal to control image data input V-Data and the timing control circuit TCON 18. The display control signals include a horizontal synchronizing signal HD that is used as reference signal to synchronize the liquid crystal panel in a horizontal direction, a vertical synchronizing signal VD that is used as a reference signal to synchronize the liquid crystal panel in a vertical direction, a data enable signal DENA that indicates a period during which image data is effective, a dot clock DCLK that becomes a reference at the time of reading the control signal, and the like (hereinafter, the horizontal synchronizing signal is simply referred to as HD, the vertical synchronizing signal is simply referred to as VD, and the data enable signal is simply referred to as DENA. When the data enable signal DENA is at a high level, the data enable signal DENA indicates that the image data input V-Data is effective, and when the data enable signal DENA is at a low level, the data enable signal DENA indicates that the image data input V-Data is invalid) Since the input timings and types of these display control signals are well known, they are not described herein.

Further, source driver control signals that are output from the timing control circuit TCON 18 in order to control the source driver ICs 6 to 13 are divided into image display data RGB-Data corresponding to display luminance of a display pixel, and driving control signals to control input and output timings of the image display data RGB-Data or the like. Further, the driving control signals include a shift clock SCLK, a horizontal start pulse STH, a latch pulse LP, and a polarity inverting signal POL. Further, the timing control circuit TCON 18 outputs a vertical start pulse STV and a clock V, that is, CLKV that serve as gate driver control signals to control the gate driver ICs 3 to 5 (hereinafter, the horizontal start pulse is simply referred to as STH, the polarity inverting signal is simply referred to as POL, and the latch pulse is simply referred to as LP).

Further, the source driver ICs 6 to 13 integrate driving circuits that drive a plurality of image signal lines 14 (in this case, the signal line is only shown at the leftmost side in order to simplify the drawings), and the gate driver ICs 3 to 5 integrate driving circuits that drive a plurality of scanning signal lines 15 (gate lines; in this case, the scanning signal line is only shown at the uppermost side in order to simplify the drawings). Furthermore, the plurality of silicon semiconductor integrated circuits are used to accept the number of the image signal lines and the number of the scanning signal lines in the liquid crystal panel 2.

Next, the signals that are output from the timing control circuit TCON 18 and control the source driver ICs 6 to 13 will be described in detail. Each image display data RGB-Data includes digital signals for R (red), G (green), and B (blue), and forms a data bus with a predetermined number of bits. The image display data RGB-Data is output to the source driver ICs 6 to 13 together with driving control signals. In this case, the driving control signals include a shift clock SCLK that becomes a reference to perform a data input process, the horizontal start pulse STH that indicates the start of the display data and indicates the start of the data shift, the polarity inverting signal POL that inverts a polarity of the liquid crystal driving, the latch pulse LP that transmits the display data RGB-Data to the signal output terminal sides of the source driver ICs 6 to 13, and the like.

Further, the signals that are output from the timing control circuit TCON 18 and control the gate driver ICs 3 to 5 include a clock V CLKV that performs a signal process by the gate driver ICs, a vertical start pulse STV that indicates the start of the vertical scanning, and the like.

The source driver ICs 6 to 13 write desired image signals in the respective pixel portions 16 (pixel portions located at the uppermost and leftmost sides are only shown) that correspond to the scanning signal lines having became active by the gate driver ICs 3 to 5. Generally, the writing control operation are sequentially performed on the respective scanning signal lines 15 (only the uppermost end in the drawings) from the upper side for every row in synchronization with the horizontal scanning, and image display of the entire screen is performed. Since the basic operation timings of these signals are well known, the description thereof will be omitted.

The timing control circuit TCON 18 of FIG. 1 generates control signals with respect to the source driver ICs 6 to 13 and the gate driver ICs 3 to 5 in synchronization with a dot clock DCLK on the basis of the horizontal synchronizing signal HD, the vertical synchronizing signal VD, and the data enable signal DENA input from the external signal source. Further, the horizontal reference signal generating circuit (not shown), which generates a pseudo horizontal reference signal during the vertical blanking period is also incorporated in the timing control circuit TCON 18.

Figure 2:
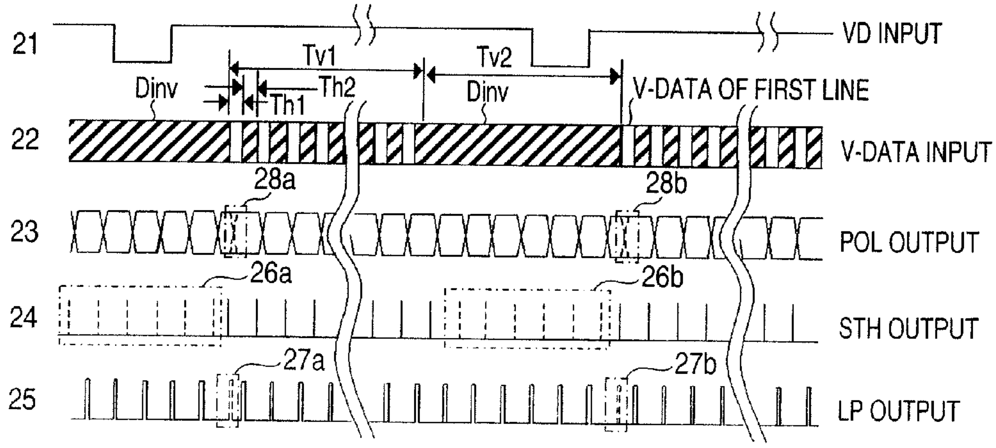
FIG. 2 is a waveform diagram of a signal that is transmitted to source driver ICs from a timing control circuit according to first and second embodiments of the invention.

FIG. 2 is a diagram illustrating a waveform of the driving control signal that is transmitted from the timing control circuit TCON 18 according to the first embodiment to the source driver ICs 6 to 13. In FIG. 2, reference numeral 21 indicates an input waveform of the vertical synchronizing signal VD, and the vertical synchronizing signal is generally a signal that is input to the timing control circuit TCON 18. However, it is shown for reference in order to define the vertical scanning period Tv1 and the blanking period Tv2 in the drawings.

First, the input signal to the timing control circuit TCON 18 in FIG. 2 will be described. Reference numeral 22 indicates an image data input V-Data waveform that is input to the timing control circuit TCON 18. The period Tv of the vertical synchronizing signal VD that is indicated by reference numeral 21 satisfies the condition Tv=Tv1+Tv2. In this case, reference character Tv1 indicates a vertical scanning period, and reference character Tv2 indicates a vertical blanking period. The vertical scanning period Tv1 includes a predetermined number of horizontal periods Th. The horizontal period Th satisfies the condition Th=Th1+Th2. In this case, reference character Th1 indicates a horizontal scanning period, and reference character Th2 indicates a horizontal blanking period. An portion with hatching shown in FIG. 2 of a waveform 22 of the pixel data signal V-Data indicates a non-effective display period, that is, a waveform of an image data signal during a period other than the effective display period, and indicates an undefined state. During the vertical blanking period Tv2 and the horizontal blanking period Th2, the image data input V-Data becomes invalid data Dinv.

Next, an output signal of the timing control circuit TCON 18 will be described. Reference numeral 23 indicates an output waveform of the polarity inverting signal POL, reference numeral 24 indicates an output waveform of the horizontal start pulse STH, and reference numeral 25 indicates an output waveform of the latch pulse LP. These driving control signals are supplied to the source driver ICs 6 to 13. On the basis of the driving control signals, each image signal line 14 of the liquid crystal panel is driven in alternating current with a voltage according to each image signal. Specifically, the POL waveform 23 is a reference signal to perform a D/A conversion on a pixel voltage applied to the liquid crystal of the liquid crystal panel, reference numeral 24 indicates the horizontal start pulse STH waveform that starts the acquisition of the pixel data with respect to the source driver ICs 6 to 13. The latch pulse LP waveform 25 indicates a pulse signal waveform that indicates a timing at which the image data and the polarity inverting signal POL 23 acquired in the source driver ICs 6 to 13 are latched, and the driving voltage having been subjected to the D/A conversion is applied to the image signal line 14 so as to reflect it on the output.

In this embodiment, as shown in FIG. 2, even during the vertical blanking period Tv2 excluding a partial period to be described below, the polarity inverting signal POL waveform 23, the horizontal start pulse STH waveform 24, and the latch pulse LP waveform 25 are transmitted to the source driver ICs 6 to 13 so as to continuously drive the liquid crystal panel 2.

In this embodiment, when a predetermined period that is determined by the circuit specifications of the source driver ICs 6 to 13 and the output timing of the latch pulse LP or the polarity inverting signal POL overlap after a high level signal (not shown) is input to the data enable signal DENA, the output of the latch pulse LP or the polarity inverting signal POL in the period is erased. This operation allows a countermeasure of the case as described above, in which a synchronizing signal among the display control signals that are input from the external signal source to the timing control circuit TCON 18 varies, the length of the vertical blanking period Tv2 varies, and an erroneous operation occurs in controlling a next vertical scanning period Tv1, or in which during the vertical blanking period Tv2, one horizontal period or half of the one horizontal period varies and the erroneous operation occurs.

The output erasing timing will be described with reference to FIG. 2. In an example of the waveform shown in FIG. 2, in the polarity inverting signal POL waveform indicated by reference numeral 23, the polarity inverting of the polarity inverting signal POL is erased at the portions of the ranges 28*a* and 28*b* that are surrounded by one-dot chain lines (waveform portions shown by the broken lines). Further, in the LP signal waveform indicated by reference numeral 24, the LP output is erased at the portions of the ranges 27*a* and 27*b* that are surrounded by one-dot chain lines (waveform portions shown by the broken lines).

As described above, in the source driver ICs 6 to 13, the ranges that are surrounded by the one-dot chain lines are determined by the circuit specification, and before the latch pulse LP is input, the horizontal start pulse STH and the polarity inverting signal POL in the several shift clock SCLK periods become invalid. When the horizontal start pulse STH corresponding to the first horizontal scanning period Th1 (high-level period of the data enable signal DENA) after the vertical blanking Tv2 period becomes invalid, the read operation of the image data that corresponds to the horizontal scanning period Th1 is not correctly performed by the driver ICs 6 to 13, which causes a display defect. As such, when it is anticipated that the driving control signals, such as the latch pulse LP or the polarity inverting signal POL, which are transmitted during the predetermined period, may cause an erroneous operation on display of a next frame, each variation or generation of the driving control signals during periods that are surrounded by one-dot chain lines and are indicated by reference numerals 27*a*, 27*b*, 28*a*, and 28*b* of FIG. 2 is erased. As a result, during the period, the updating operation on the output voltage of the source driver ICs is intermitted. In this case, 'the updating being intermitted' means that the variation of the driving control signal (in particular, LP signal) is erased such that the driver IC as a main portion of the image signal line driving unit having received the signal does not enter a control state outputting the new voltage.

Further, during a first period that is indicated by reference numerals 26*a* and 26*b* and is surrounded by one-dot chain lines in the waveform shown by reference numeral 24 in FIG. 2, the horizontal start pulse STH output (six pulses shown by the broken lines in the example of FIG. 2) is erased. After the data enable signal DENA becomes the high level (not shown), the horizontal start pulse STH output is performed again at the timing based on the input (rising). Accordingly, since the horizontal start pulse STH is not input during the first period, the read operation of the image display data is intermitted in the source driver ICs 6 to 13. In this case, 'the read operation being intermitted' means that the horizontal start pulse STH output is erased, and thus the source driver ICs 6 to 13 do not enter a control state where the source driver ICs 6 to 13 can receive the new image display data. This can be made because after the source driver ICs receive the latch pulse LP and execute the updating of the output voltage, the source driver ICs do not enter a state capable of receiving the image display data until the next horizontal start pulse STH signal is input.

In this embodiment, in order to erase the horizontal start pulse STH 24 according to the first period, first, the horizontal start pulse STH 24 is intermitted in the middle of the vertical blanking period Tv2. The horizontal start pulse STH 24 is preferably intermitted in the first half of the vertical blanking period Tv2. That is, the length of the first period in which the horizontal start pulse STH 24 is intermitted is set to exceed half the length of the vertical blanking period Tv2. Accordingly, in the second half of the vertical blanking period Tv2, at least the polarity inverting signal POL 23 and the latch pulse LP 25 are transmitted to the source driver ICs 6 to 13, and even during the vertical blanking period Tv2, the liquid crystal panel 2 is periodically driven in alternating current with the horizontal period Th or the period similar to the horizontal period.

Figure 3:
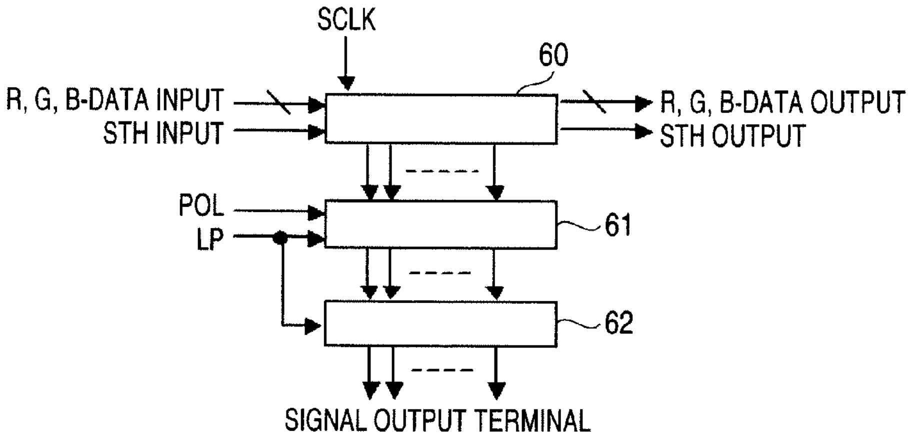
FIG. 3 is a diagram illustrating structures of source drivers IC according to first and second embodiments of the invention.

The source driver IC that is generally widely spread has the structure shown in FIG. 3. During the intermittent period (first period) of the horizontal start pulse STH, by using the image data accumulated in the shift register 60 or the resister 61 receiving the data from the shift register 60 and by inputting the latch pulse LP at a predetermined timing, in accordance with the input timing of the latch pulse LP, the digital/analog converting circuit DAC 62 operates so as to perform a D/A conversion process on the image data, and applies the voltage for driving the liquid crystal panel 2 to the image signal line 14 (it is assumed that the polarity inverting signal POL is inverted at the timing that is not contradictory to the restriction of the input timing of the source driver IC).

Next, the structure of the source driver control signal generating circuit 36 that has the minimum structure implementing this embodiment and generates the timings of the horizontal start pulse STH and the latch pulse LP during the above-described vertical blanking period Tv2 will be described in detail with reference to FIG. 4. In this case, the signals shown in FIG. 4 indicate main signals implementing this embodiment, and are signals that are synchronized with a shift clock SCLK of an arbitrary frequency (not shown). In this embodiment, as shown in FIG. 1, the source driver control signal generating circuit 36 is incorporated in the timing control circuit TCON 18, but it may not be incorporated in the timing control circuit TCON 18.

Figure 4:
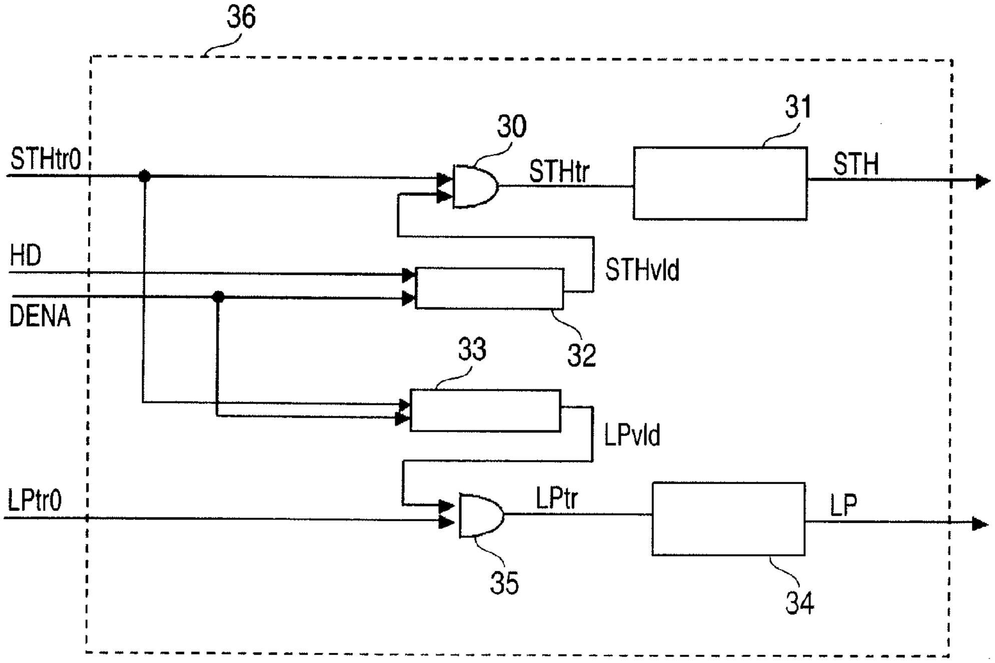
FIG. 4 is a diagram illustrating a structure of a source driver control signal generating circuit according to a first embodiment of the invention.

In FIG. 4, the horizontal start pulse trigger source signal STHtr0 is a trigger signal that indicates the generation timing of the horizontal start pulse STH, and is generated by the horizontal reference signal generating circuit (not shown) from the synchronizing signals including the a dot clock DCLK, the horizontal synchronizing signal HD, the vertical synchronizing signal VD, and the data enable signal DENA from the external signal source to the timing control circuit TCON 18. Further, the latch pulse trigger source signal LPtr0 is a trigger signal that indicates the generation timing of the latch pulse LP, and is generated by the horizontal reference signal generating circuit (not shown) from the synchronizing signals. Furthermore, the plurality of external signal sources do not output the data enable signal DENA or the horizontal synchronizing signal HD, and the vertical synchronizing signal VD to the timing control circuit TCON 18 during the vertical blanking period Tv2. As described above, since the liquid crystal panel 2 is driven, the data enable signal DENA or the horizontal synchronizing signal HD, and the vertical synchronizing signal VD to be pseudo are generated in the timing control circuit TCON 18. The horizontal start pulse trigger source signal STHtr0 or the latch pulse trigger source signal LPtr0 is generated using the data enable signal DENA or the horizontal synchronizing signal HD, and the vertical synchronizing signal VD to be pseudo during the vertical blanking period Tv2.

In this case, the horizontal start pulse trigger source signal STHtr0 is input to one terminal of the AND circuit 30, and the mask signal generating circuit 33. The latch pulse trigger source signal LPtr0 is input to one terminal of the AND circuit 35. The mask signal generating circuit 32 receives the horizontal synchronizing signal HD and the data enable signal DENA, and outputs the horizontal start pulse trigger effective signal STHvld serving as the first mask signal to the other terminal of the AND circuit 30. The mask signal generating circuit 33 receives the horizontal start pulse trigger source signal STHtr0 and the data enable signal DENA, and outputs the latch pulse trigger effective signal LPvld serving as the second mask signal to the other terminal of the AND circuit 35.

The AND circuit 30 performs a logical product on the horizontal start pulse trigger source signal STHtr0 and the horizontal start pulse trigger effective signal STHvld, and outputs the horizontal start pulse trigger signal STHtr. The AND circuit 35 performs a logical product on the latch pulse trigger source signal LPtr0 and the latch pulse trigger effective signal LPvld, and outputs the latch pulse trigger signal LPtr.

The start pulse generating circuit 31 receives the horizontal start pulse trigger signal STHtr, and outputs the STH signal. Further, the latch pulse generating circuit 34 receives the latch pulse trigger signal LPtr, and outputs the LP signal.

Next, the detailed operation and timing of each signal in the source driver control signal generating circuit 36 will be described with reference to FIG. 5 (hereinafter, in order to simplify the description, the respective signals, that is, the horizontal start pulse trigger source signal is simply referred to as STHtr0, the latch pulse trigger source signal is simply referred to as LPtr0, the horizontal start pulse trigger effective signal is simply referred to as STHvld, the latch pulse trigger effective signal is simply referred to as LPvld, the horizontal start pulse trigger signal is simply referred to as STHtr, and the latch pulse trigger signal is simply referred to as Ptr).

Figure 5:
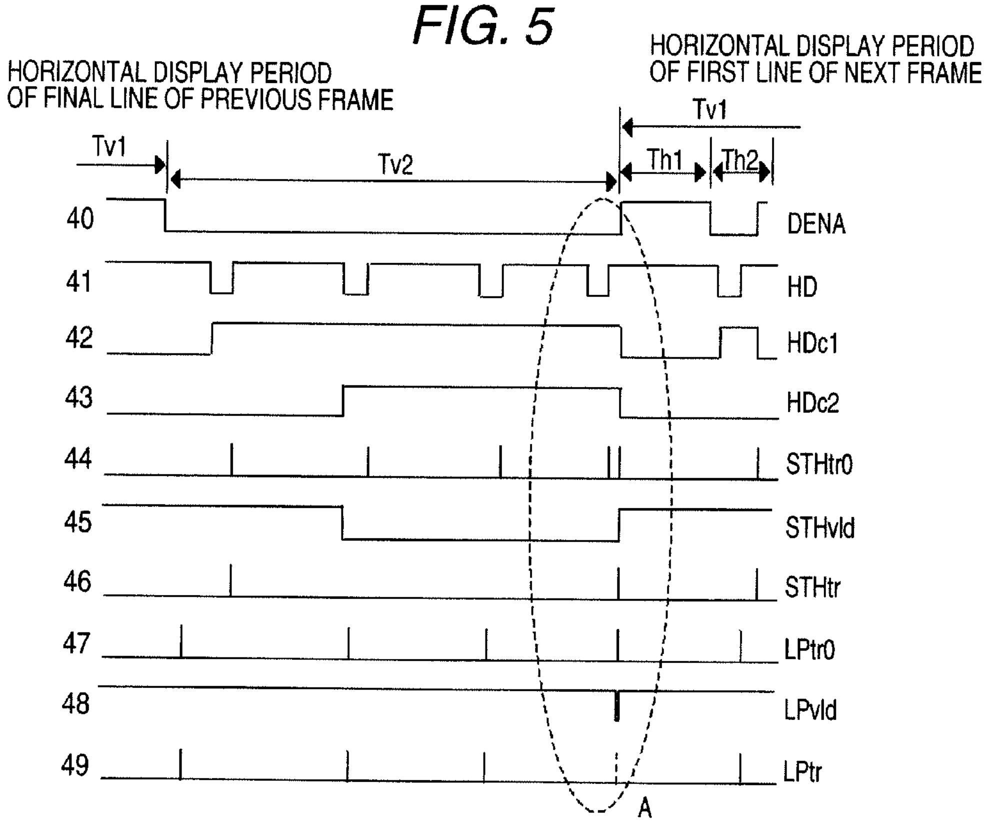
FIG. 5 is a waveform diagram illustrating an operation timing of each signal in a source driver control signal generating circuit according to a first embodiment of the invention.

First, reference numerals 40 and 41 of FIG. 5 indicate the data enable signal DENA waveform and the horizontal synchronizing signal HD waveform, which are an example of the signals input from the external signal source to the timing control circuit TCON 18. In this embodiment, in order to simplify the description, the length of the vertical blanking period Tv2 is approximately three times the length of the horizontal period Th, but is generally several tens of times the length of the horizontal period Th. The first internal signal HDc1 that is shown by the waveform indicated by reference numeral 42 is an internal signal in the mask signal generating circuit 32, and becomes a high level by the falling of the horizontal synchronizing signal HD during the vertical blanking period Tv2. If the data enable signal DENA is input, it is determined that the display period of the next frame starts, and the first internal signal becomes a low level.

Further, the second internal signal HDc2 that is shown by the waveform indicated by reference numeral 43 is an internal signal in the mask signal generating circuit 32. When the first internal signal HDc1 becomes a high level at the falling timing of the horizontal synchronizing signal HD during the vertical blanking period Tv2, the value of the first internal signal HDc1 is shifted. However, if the data enable signal DENA is input, it is determined that the display period of the next frame starts, and the second internal signal HDc2 becomes a low level. Further, the signal that is obtained by inverting the logical level of the second internal signal HDc2 is the horizontal start pulse trigger effective signal STHvld, and the schematic timing signal waveform thereof is indicated by reference numeral 45.

That is, the first internal signal HDc1 and the second internal signal HDc2 are the internal signals in the mask signal generating circuit 32, and the output signal of the mask signal generating circuit 32 becomes the horizontal start pulse trigger effective signal STHvld.

Next, reference numeral 48 indicates the LPvld waveform, and indicates the pulse signal that becomes a low level during the period from the rising edge of the data enable signal DENA starting the display period of an arbitrary frame to the STHtr0 shown by the waveform indicated by reference numeral 44, and becomes a high level during the other period. As described above, the signal is generated by the mask signal generating circuit 33 from the data enable signal DENA and the STHtr0.

Since the STHvld passes through the AND circuit 30 together with the STHtr0, the STHtr that is obtained by cutting the unnecessary portion from the STHtr0 is input to the start pulse generating circuit 31. Accordingly, as shown by the waveform indicated by reference numeral 46 in FIG. 5, the STHtr is fixed at a low level according to the first period of the second half of the vertical blanking period Tv2 with respect to the STHtr0 indicated by reference numeral 44, and is erased. As described above, during the corresponding period, the read operation of the image display data by the source driver ICs 6 to 13 is intermitted.

Since the LPvld indicated by reference numeral 48 passes through the AND circuit 35 together with the LPtr0 that is shown by the waveform indicated by reference numeral 47, the LPtr that is obtained by cutting the unnecessary portion from the LPtr0 is input to the latch pulse generating circuit 34. That is, the unnecessary portion of the LPtr0 is masked by the LPvld. Accordingly, as shown by the waveform indicated by reference numeral 49, of the LPtr0, the LPtr is fixed at a low level by a final portion of the vertical blanking period Tv2 only when the LPtr0 corresponds to the low period of the LPvld, and is erased.

Figure 6:
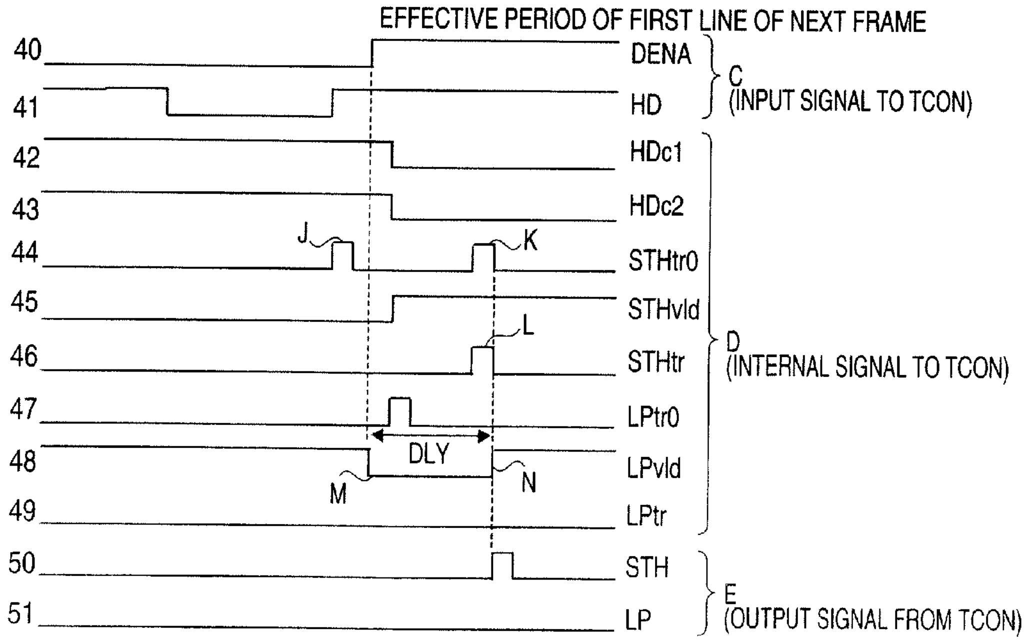
FIG. 6 is a waveform diagram specifically illustrating an operation timing of each signal in a source driver control signal generating circuit according to a first embodiment of the invention.

Further, in order to describe the timing in detail, FIG. 6 is used as an enlarged diagram of an "A" portion shown by broken lines of FIG. 5.

In FIG. 6, a signal group that is shown by reference character C includes the data enable signal DENA and the horizontal synchronizing signal HD, and is a portion of signals input to the timing control circuit TCON 18. A signal group that is shown by reference character D is a portion of the internal signal that is generated by the source driver control signal generating circuit 36 in the timing control circuit TCON 18, and includes HDc1 to LPtr. The signal group that is indicated by reference character E includes the horizontal start pulse STH and the latch pulse LP, and indicates a portion of signals output from the timing control circuit TCON 18.

In FIG. 6, as shown by the waveforms indicated by reference numerals 40, 41, 42, and 43, in accordance with the first rising of the data enable signal DENA after starting the effective period of the first line of the next frame, that is, after completing the vertical blanking period Tv2, the first internal signal HDc1 and the second internal signal HDc2 become a low level (waveforms indicated by reference numerals 42 and 43). As described above, the STHvld waveform that is indicated by reference numeral 45 becomes a logical inversion signal of the second internal signal HDc2.

In this case, in an example of the STHtr0 waveform shown by reference numeral 44 in FIG. 6, the pulse signal J that is generated by the horizontal reference signal generating circuit during the vertical blanking period Tv2, and the pulse signal K that is generated after starting the effective period of the first line of the next frame (after the rising of the data enable signal DENA) are described. However, since the STHtr that has passed through the AND circuit 30 is a logical product signal with the STHvld, it becomes only the waveform of the pulse signal L, as indicated by reference numeral 46. In this case, the pulse signal J in the STHtr0 is a signal that is pseudo-generated by the horizontal reference signal generating circuit, and the pulse signal K is generated on the basis of the rising timing of the data enable signal DENA that is input from the external signal source. For this reason, if the length of the vertical blanking period varies, the location of the pulse signal J may vary relative with the rising of the data enable signal DENA. However, the location of the pulse signal K and the location of the pulse signal L of the STHtr do not vary.

As described above, the LPtr0 that is shown by the waveform indicated by reference numeral 47 is a signal that is input to the source driver control signal generating circuit 36, and is generated by the horizontal reference signal generating circuit in the timing control circuit TCON 18. As described above, the LPvld that is shown by the waveform indicated by reference numeral 48 becomes a low level during a period (that is, period between the first time point M and the second time point N) corresponding to the period DLY until the STHtr0 (falling time point of the DENA, which is referred to as the second time point N) after the effective period of the first line of the next frame (rising time point of the DENA, which is referred to as the first time point M), and becomes a high level during the other period. The high level signal of the LPtr0 that corresponds to the low level period passes through the AND circuit 35 to be erased, and becomes a low level, as shown by the waveform indicated by reference numeral 49. Therefore, the LP signal waveform that is indicated by reference numeral 51 also becomes a low level. As a result, as described above, during the period that corresponds to the period DLY, the updating operation of the output voltage of the source driver ICs is intermitted. Further, the STH signal that is shown by the waveform indicated by reference numeral 50 is a signal generated when the STHtr passes through the start pulse signal generating circuit 31, and is output from the start pulse generating circuit 31 with the predetermined delay. The timing control circuit TCON 18 sets the first time point M (see FIG. 6) and the second time point N (see FIG. 6) so that the period DLY (see FIG. 6) between the first time point and the second time point is shorter than one horizontal scanning period Th1 of the vertical scanning period Tv1.

In this case, as described above, the STH is intermitted in the first half of the vertical blanking period in advance. Therefore, in the signals input to the source driver IC thereafter, the signal where the restriction violation may occur between the control signal during the vertical blanking period and the control signal during the start display period of the next frame is associated with the period from the LP (rising) output in the final interval of the vertical blanking period to the rising of the horizontal start pulse STH.

If the period, that is, the period corresponding to the period DLY is smaller than a predetermined value that is determined by the specification of the source driver IC, the length of the vertical blanking period or the pseudo horizontal synchronizing signal HD causes an erroneous operation in the source driver IC during the vertical scanning period Tv1 of the next frame, which causes abnormality in the display image. However, the predetermined value is converted into the period of the shift clock SCLK output from the timing control circuit TCON 18 to the source driver ICs 6 to 13, becomes correspond to the several clocks, can be sufficiently reduced when actually used, and allows the influence on the display screen to be reduced. When considering this point, only the rising LPtr0 signal may be removed in the period corresponding to the several clocks that have considered the possibility corresponding to the restriction.

Figure 7:
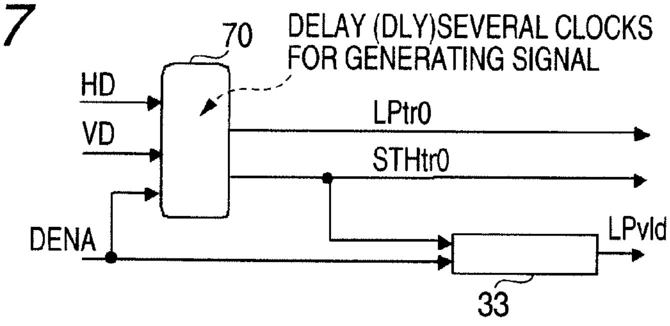
FIG. 7 is a diagram illustrating a structure of an additional functional circuit in timing control circuits according to first and second embodiment of the invention.

According to this concept, as shown in FIG. 7, the STHtr0 and the LPtr0 are generated in synchronization with the timing more delayed by several clocks than the input signals DENA, HD, and VD of the timing control circuit TCON 18. In particular, if various additional functional circuits 70 are provided in the timing control circuit TCON 18, with respect to the input timing, the synchronizing timings of the STHtr0 and the LPtr0 that have been generated are further delayed by the synchronizing timings of the input signals (the delayed value corresponds to the DLY).

Meanwhile, the data enable signal DENA that is input to the mask signal generating circuit 33 uses a signal that is rarely delayed, as compared with the delayed amount DLY of the input signal to the timing control circuit TCON 18. As a result, it can be anticipated that the scanning period of the first line of the next frame starts several shift clocks SCLK before the LPtr0 is generated starts, and the LPtr0 that is generated during the period until the STHtr0 is generated thereafter can be erased by the LPvld.

Further, according to the restriction of the predetermined value of the source driver IC, by adjusting the synchronizing timing of the LPtr0 or the input timing of the data enable signal DENA to the mask signal generating circuit 33 or the delayed DLY value, it is possible to remove the restriction of the predetermined value by the LP.

Accordingly the timing control circuit 18 sets the first time point M (see FIG. 6) and the second time point N (see FIG. 6) so that the period DLY (see FIG. 6) between the first time point M and the second time point L includes an input inhibiting period of a latch pulse that is determined in advance in accordance with a structure of the source driver ICs 6 to 13.

In this embodiment, after the vertical blanking period starts, the output of the horizontal start pulse STH is intermitted after one horizontal period passes, but if the driving of the horizontal start pulse STH corresponding to the final several horizontal periods of the vertical blanking period is surely intermitted, the essential conditions of this embodiment can be sufficiently satisfied.

Further, in this embodiment, a signal inverting inhibiting method in the specific periods (reference numerals 28*a* and 28*b*) with respect to the POL waveform (indicated by reference numeral 23) shown in FIG. 2 is not described, but it could be understood that if the necessity exists on the visual quality of the display, the same method and structure as in the LP signal are used, and the signal inverting inhibiting can be implemented.

Figure 8:
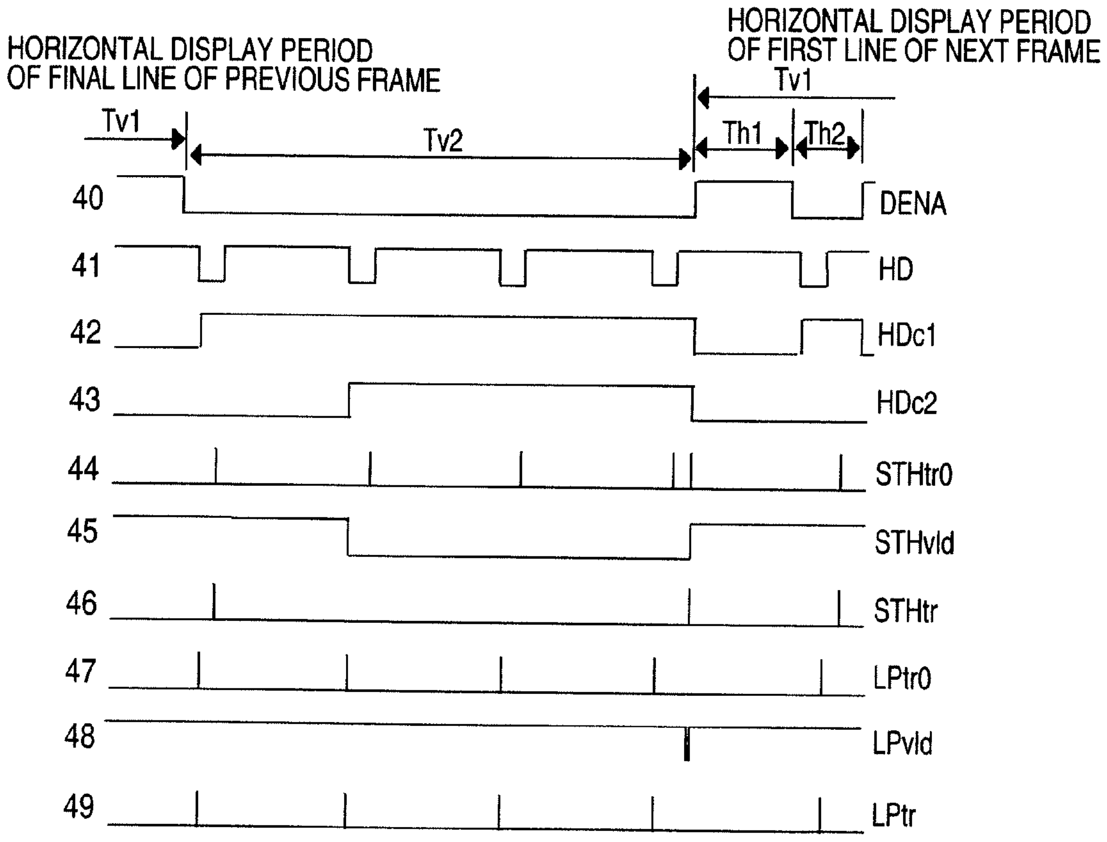
FIG. 8 is a waveform diagram illustrating an operation timing of each signal in a source driver control signal generating circuit according to a first embodiment of the invention.

As shown in FIG. 8, according to the timings of the synchronizing signals VD, HD, and DENA of the external signal source, the pseudo horizontal synchronizing signal HD of the vertical blanking period Tv2 can be continuously generated with the same period as the regular HD during the vertical scanning period Tv1. In this case, since the LPtr0 is not generated during the low level period of the LPvld, the STHtr in the low level period in which the STHvld is at a low level is only erased without erasing the LPtr.

Further, according to the structure of the timing control circuit TCON, during the vertical blanking period Tv2, the timing control circuit TCON generates the pseudo data enable signal DENA, and controls the image signal line driving unit. In this case, during the vertical blanking period Tv2, the pseudo data enable signal DENA is used instead of the pseudo horizontal synchronizing signal HD, and the falling timing of the STHvld may be generated. However, as the trigger of the rising timing of the STHvld, it is necessary to use the rising of the external input DENA that corresponds to the input image data.

Second Embodiment

Figure 9:
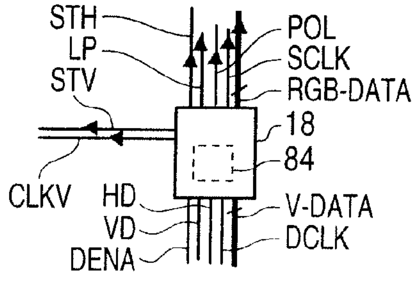
FIG. 9 is a diagram illustrating a structure of a timing control circuit according to a second embodiment of the invention.

The structure of the liquid crystal display device according to this embodiment is similar to the structure of the liquid crystal display device according to the first embodiment shown in FIG. 1. Therefore, the detailed description is omitted and the different structure is only described. The structure of the timing control circuit (TCON) 18 is shown in FIG. 9. The input and output signal of the timing control circuit TCON 18 in this embodiment is the same as that of the above-described first embodiment, and the detailed description thereof is omitted therein. In FIG. 9, reference numeral 84 indicates a source driver control signal generating circuit, and corresponds to the source driver control signal generating circuit 34 in the above-described first embodiment. In the source driver control signal generating circuit according to the second embodiment, the internal structure is different from that of the source driver control signal generating circuit according to the first embodiment, but performs the same function as the source driver control signal generating circuit according to the first embodiment.

Next, a timing of each of the input and output signals from the timing control circuit TCON 18 will be described with reference to FIG. 2. Similar to the first embodiment, even in the second embodiment, first, the output of the horizontal start pulse STH is intermitted (set to a low level) in the middle of the vertical blanking period Tv2. Even in this embodiment, during the corresponding period, the read operation of the image display data by the source driver ICs 6 to 13 is intermitted.

The horizontal start pulse STH may be intermitted in any portion of the first half of the vertical blanking period Tv2. Accordingly, during the second half of the vertical blanking period Tv2, at least the POL 23 and the LP 25 are transmitted to the source driver ICs 6 to 13, and even during the vertical blanking period Tv2, the liquid crystal panel 2 is periodically driven in alternating current with the horizontal period Th or the period similar to the horizontal period Th.

In addition, only when it is anticipated that with respect to the first horizontal scanning period Th1 of the next frame, the POL or the LP of the vertical blanking period Tv2 causes an erroneous operation, the LP or the POL that is output in the final interval of the vertical blanking period Tv2 is intermitted.

The operation according to the second embodiment is the same as that of the first embodiment. Accordingly, the drawings that shows the input and output waveform with respect to the timing control circuit TCON 18 of the vertical blanking period Tv2 are the same in the drawings according to the first embodiment, and the overlapping description is omitted.

Next, as the minimal structure that implements this embodiment, the structure of the source driver control signal generating circuit 84 that generates the timings of the STH and the LP during the above-described vertical blanking period Tv2 will be described in detail with reference to FIG. 10. The signals shown in FIG. 10 indicate main signals that implement this embodiment, and are signals that are synchronized with a shift clock SCLK of an arbitrary frequency (not shown). In this case, in this embodiment, as shown in FIG. 9, the source driver control signal generating circuit 84 is incorporated in the timing control circuit TCON 18, similar to the above-described first embodiment. However, the source driver control signal generating circuit 84 may not be incorporated in the timing control circuit TCON 18.

Figure 10:
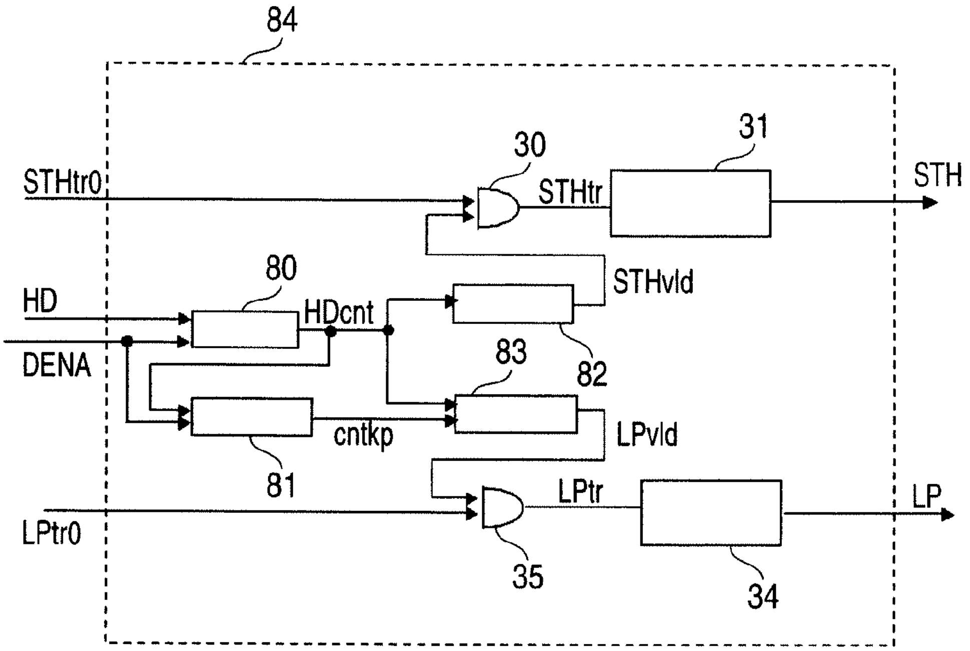
FIG. 10 is a diagram illustrating a structure of a source driver control signal generating circuit according to a second embodiment of the invention.

In FIG. 10, the horizontal start pulse trigger source signal STHtr0 is a trigger signal that indicates the generation timing of the horizontal start pulse STH, and is generated by the horizontal reference signal generating circuit (not shown) from the synchronizing signals including the a dot clock DCLK, the horizontal synchronizing signal HD, the vertical synchronizing signal VD, and the data enable signal DENA input from the external signal source to the timing control circuit TCON 18. Further, the latch pulse trigger source signal LPtr0 is a trigger signal that indicates the generation timing of the LP, and is generated by the horizontal reference signal generating circuit (not shown) from the synchronizing signals. Furthermore, the plurality of external signal sources do not output the DEN or the horizontal synchronizing signal HD, and the vertical synchronizing signal VD to the timing control circuit TCON 18 during the vertical blanking period Tv2. As described above, since the liquid crystal panel 2 is driven, the data enable signal DENA or the horizontal synchronizing signal HD, and the vertical synchronizing signal VD to be pseudo are generated in the timing control circuit TCON 18. The horizontal start pulse trigger source signal STHtr0 or the latch pulse trigger signal LPtr0 is generated using the data enable signal DENA or the horizontal synchronizing signal HD, and the vertical synchronizing signal VD to be pseudo during the vertical blanking period Tv2.

In this case, the horizontal start pulse trigger source signal STHtr0 is input to one terminal of the AND circuit 30. The latch pulse trigger source signal LPtr0 is input to one terminal of the AND circuit 35. The blanking counter 80 receives the horizontal synchronizing signal HD and the data enable signal DENA, counts the number of the HDs during the vertical blanking period, and outputs the count value HDcnt to the storage circuit 81, the first comparing circuit 82, and the second comparing circuit 83. The storage circuit 81 is a storage circuit that receives the count value HDcnt and stores the same value. The storage circuit 81 stores the count value HDcnt when the rising signal of the data enable signal DENA is input, and outputs the value to the second comparing circuit 83 as the storage value cntkp. The first comparing circuit 82 compares the count value HDcnt and the constant k (in this case, k=1). When the condition k< the count value HDcnt is satisfied, the first comparing circuit 82 outputs the low level signal to the other terminal of the AND circuit 30 as the STHvld, and when the condition k<the count value HDcnt is not satisfied, the first comparing circuit 82 outputs the high level signal to the other terminal of the AND circuit 30 as the STHvld. The second comparing circuit 83 compares the count value HDcnt and the storage value cntkp. Further, when the condition the count value HDcnt≧the storage value cntkp is satisfied, the second comparing circuit 83 outputs the low level signal to the other terminal of the AND circuit 30 as the LPvld, and when the condition the count value (HDcnt)≧the storage value (cntkp) is not satisfied, the second comparing circuit 83 outputs the high level signal to the other terminal of the AND circuit 30 as the LPvld.

The AND circuit 30 performs a logical product on the horizontal start pulse trigger source signal STHtr0 and the horizontal start pulse trigger effective signal STHvld, and outputs the horizontal start pulse trigger signal STHtr. The AND circuit 35 performs a logical product on the latch pulse trigger source signal LPtr0 and the latch pulse trigger effective signal LPvld, and outputs the latch pulse trigger signal LPtr.

The start pulse generating circuit 31 receives the horizontal start pulse trigger signal STHtr, and outputs the STH signal. Further, the latch pulse generating circuit 34 receives the latch pulse trigger signal LPtr, and outputs the LP signal.

The blanking counter 80 counts the falling of the horizontal synchronizing signal HD of the vertical blanking period Tv2. If the data enable signal DENA is input, it is determined that the vertical scanning period Tv1 of the next frame starts, and the count value HDcnt that corresponds to the output thereof is reset to 0.

Further, the count value HDcnt is stored as the count storage value cntkp in the storage circuit 81 at the timing at which the display period of the next frame starts.

Figure 11:
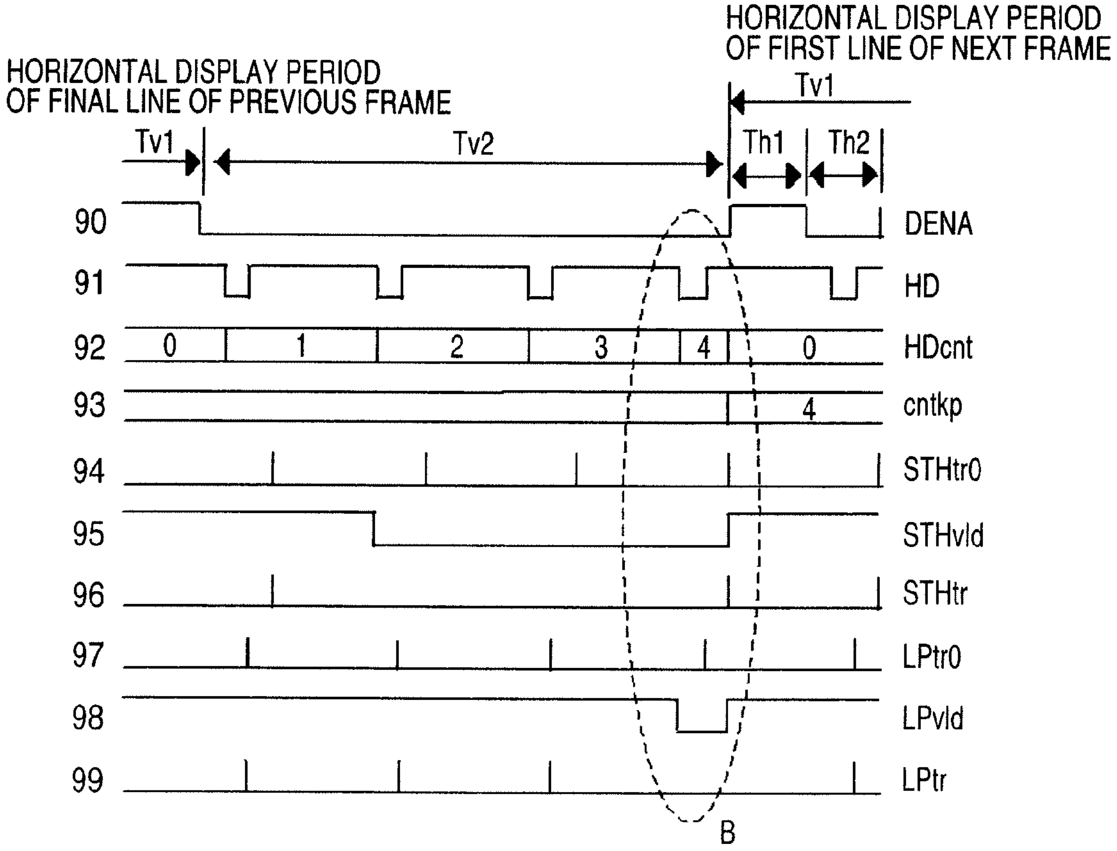
FIG. 11 is a waveform diagram illustrating an operation timing of each signal in a source driver control signal generating circuit according to a second embodiment of the invention.

Next, the detailed operation and timing of each signal in the source driver control signal generating circuit 84 will be described with reference to FIG. 11. In FIG. 11, reference numerals 90 and 91 indicate the data enable signal DENA waveform and the horizontal synchronizing signal HD waveform, which are an example of the signals input from the external signal source to the timing control circuit TCON 18. In this embodiment, in order to simplify the description, the length of the vertical blanking period Tv2 is approximately three times the length of the horizontal period Th, but is generally several tens of times the length of the horizontal period Th.

As indicated by reference numeral 92 of FIG. 11, the count value HDcnt counts the falling of the horizontal synchronizing signal HD during the vertical blanking period Tv2, and counts up 2, 3, and 4 sequentially from 1 for each falling of the horizontal synchronizing signal HD. The STHvld is output of the first comparing circuit 82, and becomes a low level when the condition k<the count value HDcnt is satisfied, and becomes a high level (in this embodiment k=1) when the condition k<the count value HDcnt is not satisfied. As indicated by reference numeral 95, when the count value HDcnt is 2 or more, it indicates the waveform that becomes a low level.

Since the STHvld passes through the AND circuit 30 together with the STHtr0 that is shown by the waveform indicated by reference numeral 94, the STHtr that is output of the AND circuit 30 is as shown by the waveform that is indicated by reference numeral 96. The STHtr is fixed at a low level according to the first period of the second half of the vertical blanking period Tv2 with respect to the STHtr0, and is erased. As described above, during the corresponding period, the read operation of the image display data by the source driver ICs 6 to 13 is intermitted.

Meanwhile, since the storage value cntkp that is indicated by reference numeral 93 is the count value HDcnt at the time point of when the rising signal of the data enable signal DENA is input, "4" is held as the storage value. The second comparing circuit 83 compares the count value HDcnt and the storage value cntkp. When the condition the count value HDcnt≧the storage value cntkp is satisfied, the second comparing circuit 83 outputs the low level signal, and when the condition the count value HDcnt≧the storage value cntkp is not satisfied, the second comparing circuit 83 outputs the high level signal. The LPvld that is the output thereof indicates a waveform that becomes a low level when the count value HDcnt becomes "4", as indicated by reference numeral 98.

Since the LPvld passes through the AND circuit 35 together with the LPtr0 that is shown by the waveform indicated by reference numeral 97, the LPtr that is obtained by cutting the unnecessary portion from the LPtr0 is input to the latch pulse generating circuit 34. That is, the unnecessary portion of the LPtr0 is masked by the LPvld. Accordingly, as shown by the waveform indicated by reference numeral 99 of FIG. 11, of the LPtr0, the LPtr is fixed at a low level by a final portion of the vertical blanking period Tv2 only when the LPtr0 is generated later than the falling timing of the horizontal synchronizing signal HD right before the horizontal scanning period Th1 of a next frame.

Figure 12:
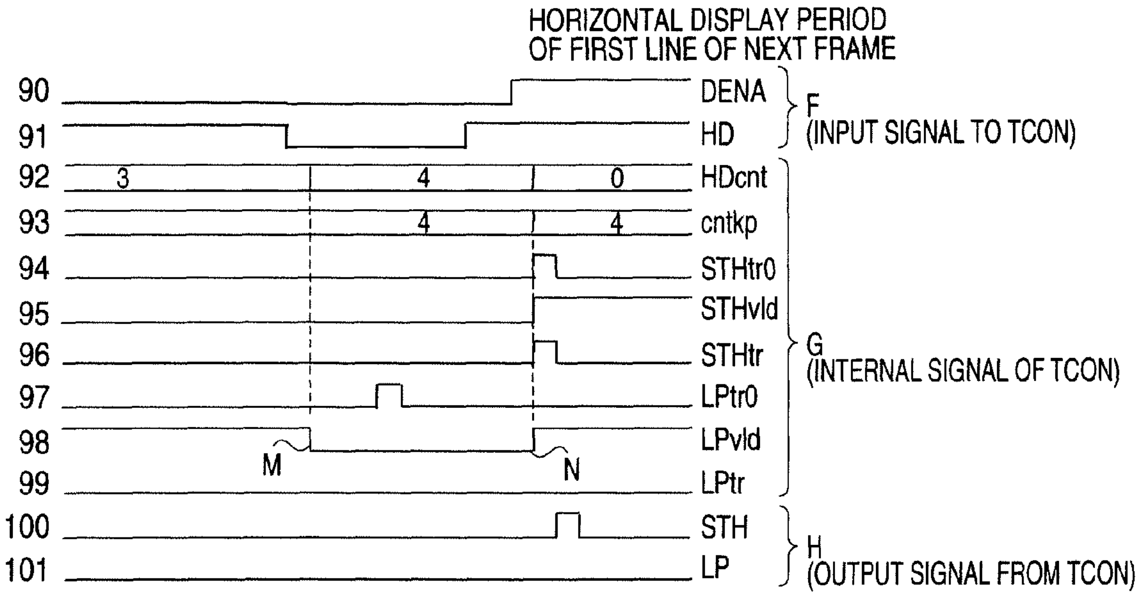
FIG. 12 is a waveform diagram specifically illustrating an operation timing of each signal in a source driver control signal generating circuit according to a second embodiment of the invention.

Further, in order to describe the timing in detail, FIG. 12 is used as an enlarged diagram of a "B" portion shown by broken lines of FIG. 11. In FIG. 12, a signal group that is shown by reference character F includes the data enable signal DENA and the horizontal synchronizing signal HD, and is a portion of signals input to the timing control circuit TCON 18. A signal group that is shown by reference character G is a portion of the internal signal that is generated by the source driver control signal generating circuit 84 in the timing control circuit TCON 18, and includes the HDcnt to the LPtr0. The signal group that is indicated by reference character H includes the STH and the LP, and indicates a portion of an output signal from the timing control circuit TCON 18. In FIG. 12, the numerical value variation timing that is indicated by reference numeral 92 is the same as that of the count value HDcnt shown in FIG. 11. Further, in FIG. 12, the numeral value variation timing that is indicated by reference numeral 93 is the same as that of the storage value cntkp shown in FIG. 11. However, FIG. 12 shows the enlarged diagram of FIG. 11. The variation timings of the count value HDcnt and the storage value cntkp with respect to the DEN and the HD are described while considering the predetermined delay by adding each signal processing time.

Even in this embodiment, since the source driver IC of the structure shown in FIG. 3 is used, as indicated by reference numeral 96 of FIG. 11, similar to the first embodiment, the STHtr is intermitted in the middle of the vertical blanking period. As a result, the horizontal start pulse STH is intermitted. During the intermittent period of the horizontal start pulse STH, if the LP is input at a predetermined timing using the image data accumulated in the shift register 60 or the resister 61 receiving the data from the shift register 60, in accordance with the input timing, the digital/analog converting circuit DAC 62 operates so as to perform a D/A conversion process on the image data, and applies the voltage for driving the liquid crystal panel 2 to the image signal line 14.

In this case, as described above, the horizontal start pulse STH is intermitted in the first half of the vertical blanking period, and in the signals input to the source driver IC thereafter, the signal where the restriction violation may occur between the control signal during the vertical blanking period Tv2 and the control signal during the display period of the next frame is associated with the period from the LP (rising) output in the final interval of the vertical blanking period to the rising of the horizontal start pulse STH.

If the period, that is, the period corresponding to the period DLY is smaller than a predetermined value that is determined by the specification of the source driver IC, the length of the vertical blanking period or the pseudo horizontal synchronizing signal HD causes an erroneous operation in the source driver IC during the vertical scanning period Tv1 of the next frame, which causes abnormality in the display image. However, the predetermined value is converted into the period of the shift clock SCLK output from the timing control circuit TCON 18 to the source driver ICs 6 to 13, corresponds to the several clocks, can be reduced when actually used, and allows the influence on the display screen to be reduced. When considering this point, only the rising LPtr0 signal may be removed in the period corresponding to the several clocks that have considered the possibility corresponding to the restriction.

Accordingly, in this embodiment, as shown in FIG. 12, in order not to output the LP generated later than the falling timing of the horizontal synchronizing signal HD right before the horizontal scanning period Th1 of the next frame at the final portion of the vertical blanking period Tv2, the LPvld (waveform indicated by reference numeral 98) becomes a low level (first time point M). As a result, as shown in FIG. 12, the LPtr (waveform indicated by reference numeral 99) is masked and erased during the period of when the LPvld is at a low level (that is, it does not become a high level). Accordingly, the LP waveform that is indicated by reference numeral 101 also becomes a low level during the corresponding period. Then, if the horizontal scanning period Th1 of the first line in the next frame starts, and the data enable signal DENA (waveform indicated by reference numeral 90) rises, the LPvld becomes a high level (second time point N), and during the following vertical scanning period Tv1, it becomes the LPtr. As a result, as described above, during the period that corresponds the period of when the LPvld is at a low level, that is, a period between the first time point M and the second time point N, the LP is not output. Therefore, the updating operation of the output voltage of the source driver IC is intermitted.

Further, since the AND circuit 30 outputs the STHtr0 (waveform indicated by reference numeral 94) only during the period of when the STHvld (waveform indicated by reference numeral 95) is at a high level, the waveform of the STHtr0 that is indicated by reference numeral 94 of FIG. 12 becomes the same waveform as the STHtr (waveform indicated by reference numeral 96). However, during a period of when the STHvld (waveform indicated by reference numeral 95) is at a low level (the second half of the vertical blanking period, and the first period), even when the high pulse of the STHtr0 is generated, the STHtr becomes a low level, and is erased. Accordingly, the STH waveform that is indicated by reference numeral 100 is a signal in which the STHtr passes through the start pulse generating circuit 31, and is output from the start pulse generating circuit 31 with the predetermined delay.

In this case, when the period from the falling of the horizontal synchronizing signal HD to the rising of the data enable signal DENA (waveform indicated by reference numeral 90) is very short, in terms of the characteristic of this embodiment, it is not possible to cut the LP generated before the falling of the horizontal synchronizing signal HD. However, similar to the above-described first embodiment, in synchronization with the timing delayed more than the general input signals DENA, HD, and VD of the timing control circuit TCON 18 by several clocks, the STHtr0 (waveform indicated by reference numeral 94 and the LPtr0 (waveform indicated by reference numeral 97) are generated.

The synchronizing timings of the STHtr0 and the LPtr0 are further delayed DLY, and it is possible to minimize portions that cannot be cut.

Further, in this embodiment, right after the vertical blanking period Tv2, the output of the horizontal start pulse STH is intermitted, but if the driving of the horizontal start pulse STH corresponding to the final several horizontal periods of the vertical blanking period is surely intermitted, the essential conditions of this embodiment can be sufficiently satisfied.

Further, in this embodiment, a signal inversion intermitting method in the specific periods (reference numerals 28*a* and 28*b*) with respect to the POL waveform (reference numeral 23) shown in FIG. 2 is not described, but it could be understood that if the necessity exists on the visual quality of the display, the same method and structure as in the LP signal are used, and the signal inversion intermitting can be implemented.

Even in this embodiment, in order to simplify the above-described object, and in order to intermit the alternating current signal only at a portion anticipated as that the alternating current signal during the vertical blanking period causes an erroneous operation with respect to the next frame display, first, the output of the start pulse for the data shift intermitted in the middle of the vertical blanking period. The start pulse for the data shift is preferably intermitted in the first half of the vertical blanking period. Accordingly, during the second half (first period) of the vertical blanking period, at least the POL and LP signals are transmitted to the source driver ICs, and enables continuous driving of the liquid crystal panel in the vertical blanking period Tv2.

In addition, during the vertical blanking period Tv2 with respect to the next frame display, only when it is anticipated that the control signal input to the driver IC, in particular, the LP signal may cause the erroneous operation, the LP that is output in the final interval of the vertical blanking period is intermitted.

Further, according to the structure of the timing control circuit TCON, during the vertical blanking period Tv2, the timing control circuit TCON generates the pseudo data enable signal DENA, and controls the image signal line driving unit. In this case, during the vertical blanking period Tv2, the data enable signal DENA may be used instead of the horizontal synchronizing signal HD, and the count value HDcnt maybe added. However, as the reset of the count value HDcnt and the storage timing of the count storage value cntkp, it is necessary to use the rising of the external input DENA that corresponds to the input image data.

In the first and second embodiments, during the vertical blanking period, the horizontal synchronizing signal HD is made not input to the timing control circuit TCON from the external signal source, the horizontal reference signal generating circuit in the timing control circuit TCON generates the pseudo horizontal synchronizing signal HD, and the control signal is continuously transmitted to the image signal line driving unit using the horizontal synchronizing signal HD during the vertical blanking period. According to the structure of the external signal source, even during the vertical blanking period, the horizontal synchronizing signal HD may be continuously transmitted. In this case, the horizontal synchronizing signal HD transmitted from the external signal source is used instead of the pseudo horizontal synchronizing signal HD, and thus the control on the image signal line driving unit can be implemented without the restriction, similar to the first and second embodiments. Further, when the period of the horizontal synchronizing signal HD during the vertical blanking period is scattered, or the number of the horizontal synchronizing signal HDs is different in the vertical blanking periods of the odd-numbered frame and the even-numbered frame, it is possible to intermit the read operation of the image display data by the image signal line driving unit according to the first period, and the LP that is output in the final interval of the vertical blanking period can be removed.

Meanwhile, the first and second embodiments adopt the source driver ICs and the gate driver ICs that use the silicon semiconductor integrated circuit as an example of the image signal line driving unit and the scanning signal lien driving unit. However, a low temperature polysilicon TFT that serves as the active element may be used, and the same circuit may be formed on the glass substrate. If the low temperature polysilicon TFT is used, the timing control circuit TCON 18 that incorporates the structure of FIG. 4 or 10 can be formed on the glass substrate.

Further, in the first and second embodiments, the liquid crystal panel is exemplified as the target that is driven by the active matrix driving circuit. However, as long as it is an image display device, such as, for example, an organic EL display device, which has an active matrix structure, it may use the same driving circuit.

According to the active matrix display device of the embodiments, during the vertical blanking period, in the active matrix display device in which a driving control signal is continuously transmitted to the image signal line driving unit, only when the final driving control signal of the vertical blanking period may cause an erroneous operation with respect to the signal of the display period of the next frame, the timing control unit is provided which can intermit the read operation on the image display data, and minimize the intermitting period.

Further, in the timing control unit, the counter does not need to be provided to count the horizontal periods of the vertical blanking period. As a result, it is not necessary to increase a size of a circuit that is incorporated in the timing control unit in order to achieve the function, which reduces the cost.

What is claimed is:

1. An active matrix display device comprising:

a plurality of pixels that are disposed in a matrix including a plurality of columns and rows;

a plurality of image signal lines that are disposed to correspond to respective columns of the pixels;

a plurality of scanning signal lines that are disposed to correspond to respective rows of the pixels;

an image signal line driving unit that supplies image signals for driving the pixels to the image signal lines; and a timing control circuit that transmits an image display control signal to the image signal line driving unit with a predetermined cycle even during a vertical blanking period, wherein the timing control circuit performs a control operation that allows the image signal line driving unit to intermit a read operation of image display data during a first period, the first period being defined within the vertical blanking period and including at least an entire second half of the vertical blanking period.

2. The active matrix display device according to claim 1, wherein the timing control circuit erases a horizontal start pulse to the image signal line driving unit during the first period.

3. The active matrix display device according to claim 1, wherein the timing control circuit sets a first time point and a second time point, the first time point is set at a predetermined time point within a time period where the read operation of the image display data is intermitted, and the second time point is set at a time point that the read operation of image display data is started in a first horizontal display period after the vertical blanking period is completed, and wherein the timing control circuit performs a control operation to allow the image signal line driving unit to intermit an updating operation of an output voltage during a period between the first time point and the second time point.

4. The active matrix display device according to claim 3, wherein the timing control circuit erases a latch pulse to the image signal line driving unit during the first time point and the second time point.

5. The active matrix display device according to claim 3, wherein the timing control circuit sets the first time point and the second time point so that a time period between the first time point and the second time point is shorter than one horizontal scanning period of the vertical scanning period.

6. The active matrix display device according to claim 3, wherein the timing control circuit sets the first time point and the second time point so that a time period between the first time point and the second time point includes an input inhibiting period of a latch pulse that is determined in advance in accordance with a structure of the image signal line driving unit.

7. The active matrix display device according to claim 1, wherein the timing control circuit sets the length of the first period exceeds half the length of the vertical blanking period.

8. A semiconductor device for timing control of an active matrix display device that includes a plurality of pixels that are disposed in a matrix including a plurality of columns and rows, a plurality of image signal lines that are disposed to correspond to respective columns of the pixels, a plurality of scanning signal lines that are disposed to correspond to respective rows of the pixels, and an image signal line driving unit that supplies image signals for driving the pixels to the image signal lines, the semiconductor device comprising:

a timing control circuit that transmits an image display control signal to the image signal line driving unit with a predetermined cycle even during a vertical blanking period, wherein the timing control circuit performs a control operation that allows the image signal line driving unit to intermit a read operation of image display data during a first period, the first period being defined within the vertical blanking period and including at least an entire second half of the vertical blanking period.

* * * * *